(12) United States Patent
Nakashima

(10) Patent No.: US 11,307,815 B2
(45) Date of Patent: Apr. 19, 2022

(54) INFORMATION PROCESSING APPARATUS, METHOD, AND NON-TRANSITORY COMPUTER-READABLE STORAGE MEDIUM TO ENCRYPT SEARCH VALUE FOR SEARCHING JOB LOG USING FIRST KEY AND SERVER PERFORMS SEARCH PROCESS

(71) Applicant: CANON KABUSHIKI KAISHA, Tokyo (JP)

(72) Inventor: Kosuke Nakashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 16/834,903

(22) Filed: Mar. 30, 2020

(65) Prior Publication Data
US 2020/0319829 A1 Oct. 8, 2020

(30) Foreign Application Priority Data
Apr. 4, 2019 (JP) .............................. JP2019-072293

(51) Int. Cl.
| G06F 3/12 | (2006.01) |
| G06F 21/60 | (2013.01) |
| H04L 9/14 | (2006.01) |
| H04L 9/30 | (2006.01) |
| H04L 9/08 | (2006.01) |

(52) U.S. Cl.
CPC .......... *G06F 3/1222* (2013.01); *G06F 3/1238* (2013.01); *G06F 3/1288* (2013.01); *G06F 21/602* (2013.01); *G06F 21/608* (2013.01); *H04L 9/14* (2013.01); *H04L 9/3073* (2013.01); *G06F 3/1273* (2013.01); *H04L 9/0838* (2013.01)

(58) Field of Classification Search
None
See application file for complete search history.

(56) References Cited

U.S. PATENT DOCUMENTS

| 8,199,356 B2 * | 6/2012 | Nakata ................. G06F 3/1239 358/1.16 |
| 2005/0195446 A1 * | 9/2005 | Kasatani ............ H04N 1/00222 358/402 |

(Continued)

FOREIGN PATENT DOCUMENTS

JP 2007-166178 A 6/2007

*Primary Examiner* — Haris Sabah
(74) *Attorney, Agent, or Firm* — Canon U.S.A., Inc. IP Division

(57) ABSTRACT

An information processing apparatus communicates with a server via a network, the server configured to manage a plurality of job logs on which encryption processing is executed by an image processing apparatus using a first key. The information processing apparatus includes at least one memory storing instructions, and at least one processor executing the instructions causing the information processing apparatus to encrypt a value used for searching for a job log using another first key being a duplicate of the first key, transmit a search request including the encrypted value to the server via the network, acquire an encrypted job log based on a response from the server, and execute decryption processing for decrypting the encrypted job log. The server executes search processing using the encrypted value included in the search request without decrypting the plurality of job logs managed.

8 Claims, 15 Drawing Sheets

(56) References Cited

U.S. PATENT DOCUMENTS

| | | | |
|---|---|---|---|
| 2006/0066902 A1* | 3/2006 | Matsui | G06F 21/645 358/1.16 |
| 2007/0133054 A1* | 6/2007 | Kobayashi | H04N 1/00244 358/1.16 |
| 2008/0235512 A1* | 9/2008 | Minagawa | G06F 3/1238 713/171 |
| 2009/0284785 A1* | 11/2009 | Bando | G06F 3/1288 358/1.15 |
| 2009/0303518 A1* | 12/2009 | Sekiya | H04N 1/32101 358/1.15 |
| 2017/0372084 A1* | 12/2017 | Murashita | H04L 9/0822 |

* cited by examiner

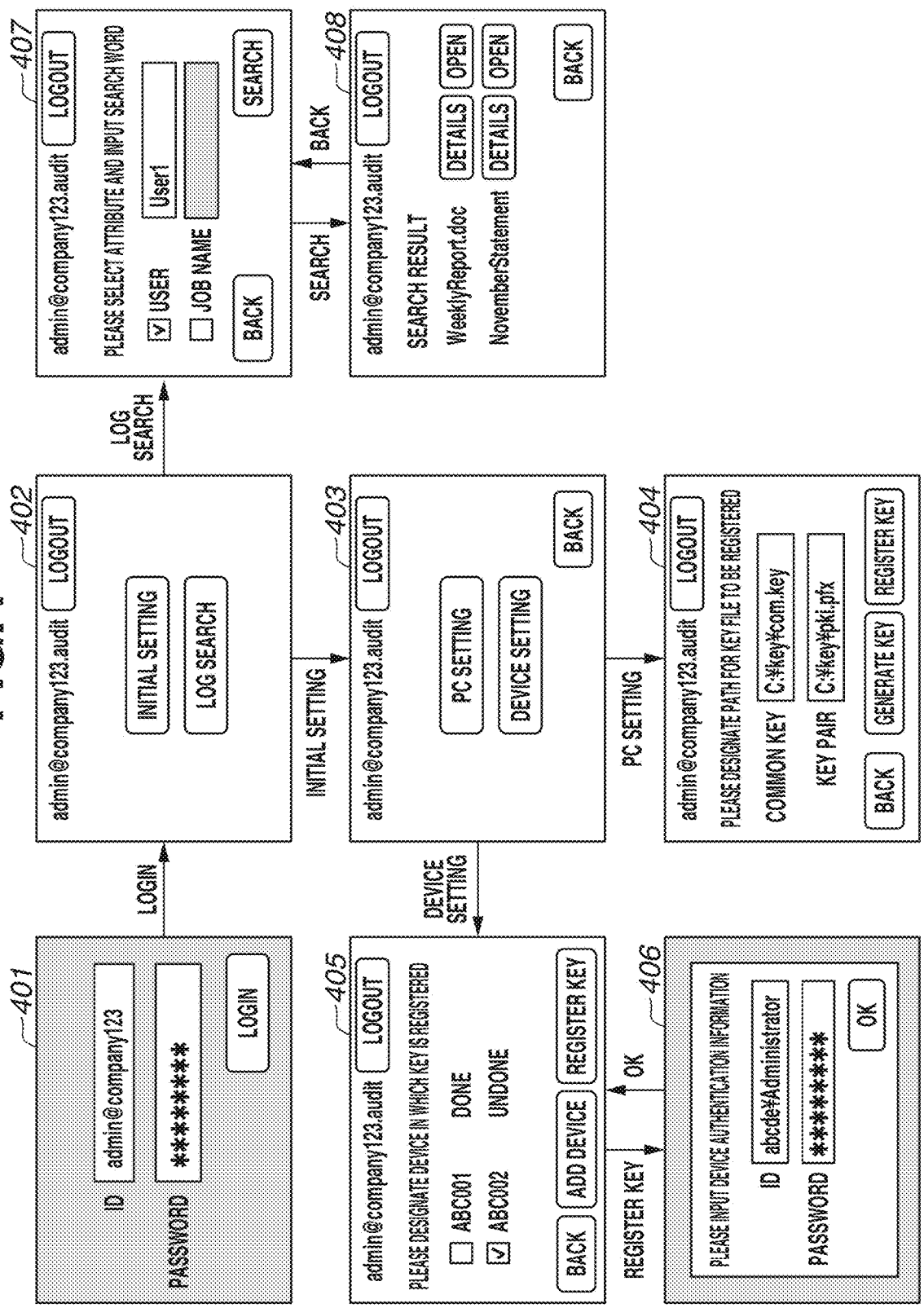

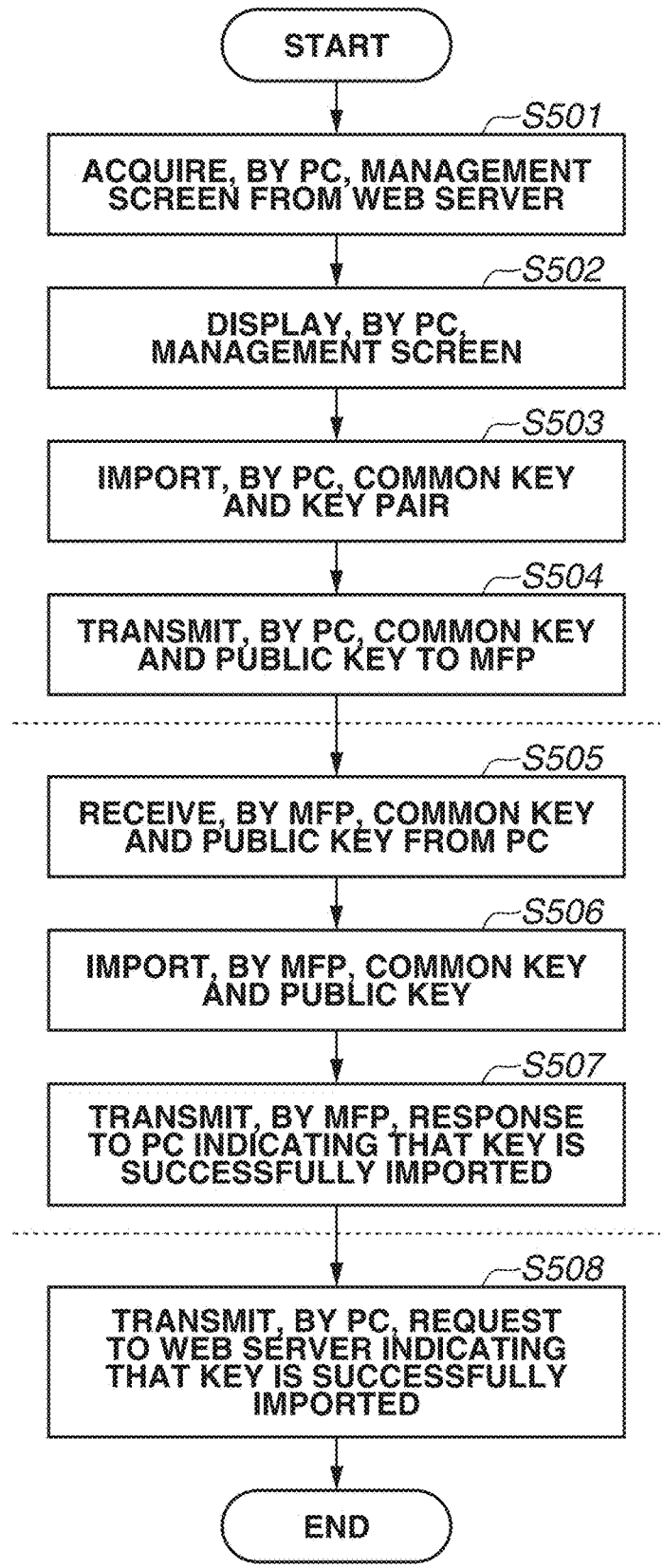

FIG.6A

```
var commonKeyData;
var keyPairData;

function readKeyData() {

// Select key files
  var files = document.querySelector('input[type=file]');

// Read key data from files
  var commonKeyReader = new FileReader();
  commonKeyReader.addEventListener("load", function () {
      commonKeyData = this.result;
  }, false);
  commonKeyReader.readAsDataURL(files[0]);

var keyPairReader = new FileReader();
  keyPairReader.addEventListener("load", function () {
      keyPairData = this.result;
  }, false);
  keyPairReader.readAsDataURL(files[0]);

```
function storeKeyData(commonKeyData, keyPairData) {

// Open DB for storing key data
  var db;
  var request = indexedDB.open("KeyStore");
  request.onsuccess = function(event) {
      db = event.target.result;
  }

// Add key data to DB
  var keys;
  keys.commonKey = commonKeyData;
  keys.keyPair = keyPairData;
  var transaction = db.transaction(["keyData"],"readwrite");
  var request = objectStore.add(keys);

// Close DB
  db.close();
}
```

FIG.6C

```
function transferKeyData(address, credential, commonKey, publicKey) { var xhr = new XMLHttpRequest();
  var url = 'https://' + address + '/importKeys';

xhr.open("POST", url, true);
  xhr.setRequestHeader("WWW-Authenticate", credential);
  xhr.onreadystatechange = returnResult();

var keys;
  keys.commonKey = commnoKey;
  keys.publicKey = publicKey;
  xhr.send(keys);
}
```

FIG.8A

HTTP GET /downloadImage/0004.pdf
Host: company123.audit
X-AccessKey:yyyyyyy

FIG.8B

HTTP/1.1 200 OK
Content-Length: 56

{"url":"/uploadImage/0001.pdf", accessKey:"yyyyyyy"}

FIG.8C

HTTP POST /uploadImage/0001.pdf
Host: company123.audit
X-Accesskey: yyyyyyy

%PDF-1.7
......
......
......
%%EOF

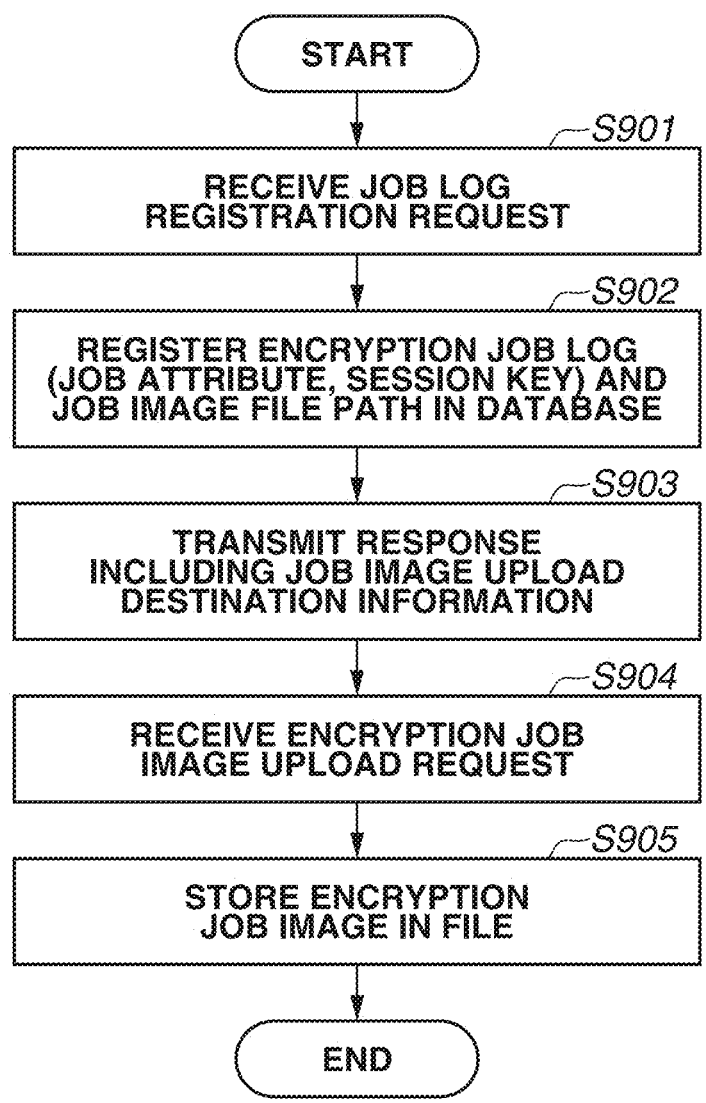

FIG.11A

```
POST /queryJobLog HTTP/1.1
Host: company123.audit
Authorization: OAuthxxxxxxxx {"username":"user1","jobtype":"scanfax"}
```

FIG.11B

```
HTTP/1.1 200 OK
Content-Length: 34

{"url":"/0004.pdf",accesskey:"yyyyyyyy","sessionkey":"********"}
```

FIG.11C

```
HTTP GET /downloadImage/0004.pdf
Host: company123.audit
X-AccessKey: yyyyyyyy
```

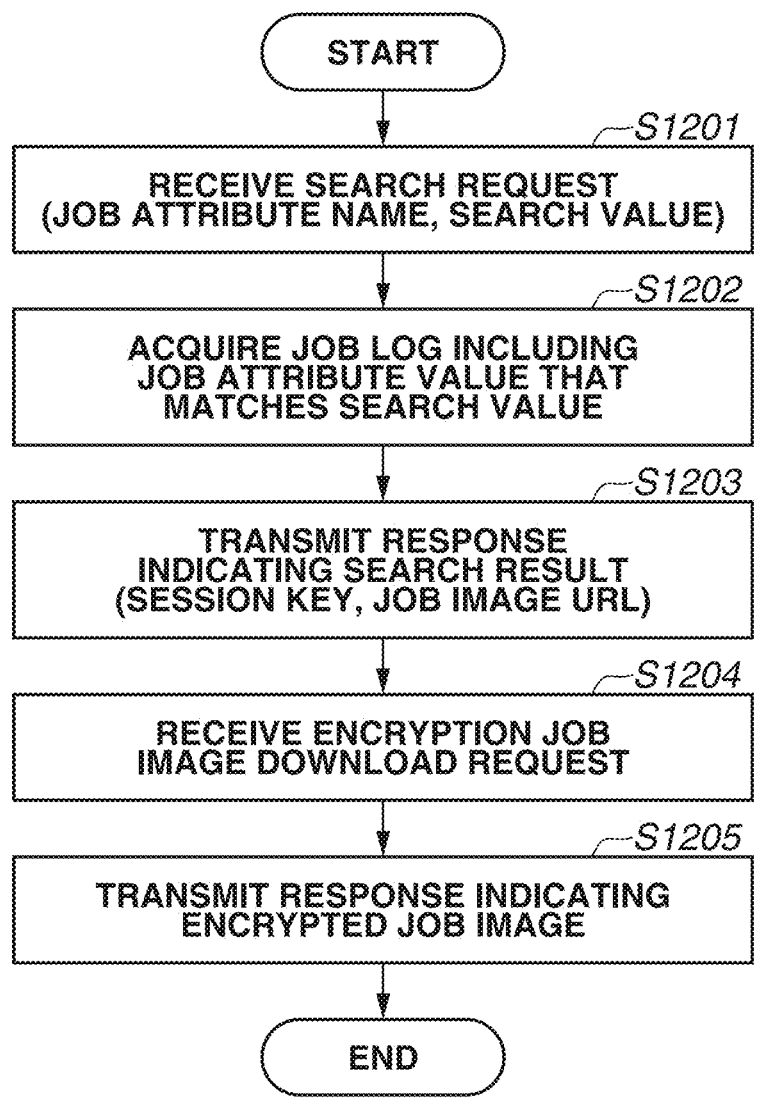

FIG.15A

```
POST /queryJobLog HTTP/1.1
Host: company123.audit
Authorization: OAuthxxxxxxxx {"ABC001":{"username":"user1","jobtype":"scanfax"},
"ABC002":{"username":"user1","jobtype":"scanfax"},
"ABC003":{"username":"user1","jobtype":"scanfax"}}
```

FIG.15B

```
HTTP/1.1 200 OK
Content-Length: 34

{"url":"/0004.pdf",accesskey:"yyyyyyyy","sessionkey":"********"}
```

FIG.15C

```
HTTP GET /downloadImage/0004.pdf
Host: company123.audit
X-AccessKey: yyyyyyyy
```

INFORMATION PROCESSING APPARATUS, METHOD, AND NON-TRANSITORY COMPUTER-READABLE STORAGE MEDIUM TO ENCRYPT SEARCH VALUE FOR SEARCHING JOB LOG USING FIRST KEY AND SERVER PERFORMS SEARCH PROCESS

BACKGROUND

Field

The present disclosure relates to a technique for recording, as log information, information indicating a user who has executed a job and an image printed in the job for a printing job, a copying job, or the like executed using an image processing apparatus.

Description of the Related Art

In order to prevent leakage of confidential information from a paper document and keep track of such confidential information, there is a multi-function peripheral (MFP), which includes a scanner and a printer, provided with a document tracking function.

Japanese Patent Application Laid-Open No. 2007-166178 discusses a technique in which, when executing a job, such as printing, copying, facsimile transmission, or facsimile reception, an MFP records a job execution log (hereinafter referred to as a job log) including image data, and transfers the job log to an external server. An administrator can refer to contents of a job executed by a user in the past by performing search processing based on job log information stored in the external server.

SUMMARY

In recent years, there is a growing trend to unify management of data stored in a company using a cloud service. There is an increasing need for managing job logs using a cloud service, while the job logs have heretofore been managed using an intranet server. In a case of managing client's confidential information using a cloud service on the Internet, security and privacy are the most important issue. In terms of security, data is generally encrypted and stored in a cloud service.

In a case of searching for data that matches a search key in a cloud service, data stored in the cloud service needs to be decrypted in the cloud service using a decryption key or the like. However, decrypting a job log that can include user information about a client in the cloud service raises concerns about privacy.

According to an aspect of the present disclosure, an information processing apparatus that communicates with a server via a network, the server configured to manage a plurality of job logs on which encryption processing is executed by an image processing apparatus using a first key, includes at least one memory storing instructions, and at least one processor executing the instructions causing the information processing apparatus to encrypt a value used for searching for a job log using another first key being a duplicate of the first key, transmit a search request including the encrypted value to the server via the network, acquire an encrypted job log based on a response from the server, and execute decryption processing for decrypting the encrypted job log. The server executes search processing using the encrypted value included in the search request without decrypting the plurality of job logs managed.

Further features of the present disclosure will become apparent from the following description of exemplary embodiments with reference to the attached drawings.

BRIEF DESCRIPTION OF THE DRAWINGS

FIG. 4 is a diagram illustrating operation screens of the PC.

FIG. 5 is a flowchart illustrating processing in which the PC and the MFP import a key.

FIGS. 6A, 6B, and 6C are diagrams each illustrating an example of JavaScript® used for, for example, importing a key.

FIGS. 8A, 8B, and 8C are diagrams each illustrating a Hypertext Transfer Protocol (HTTP) message used during registration of a job log.

FIG. 9 is a flowchart illustrating processing in which the web server registers an encryption job log.

FIGS. 11A, 11B, and 11C are diagrams each illustrating an HTTP message used during a search for a job log.

FIG. 12 is a flowchart illustrating job log search processing performed by the web server.

FIGS. 15A, 15B, and 15C are diagrams each illustrating an HTTP message used during a search for a job log according to the second exemplary embodiment.

DESCRIPTION OF THE EMBODIMENTS

Exemplary embodiments of the present disclosure will be described below with reference to the accompanying drawings. The following exemplary embodiments are not intended to limit the present disclosure set forth in the claims. Further, not all combinations of features described in the exemplary embodiments are necessarily indispensable to solving means of the present disclosure.

Figure 1:
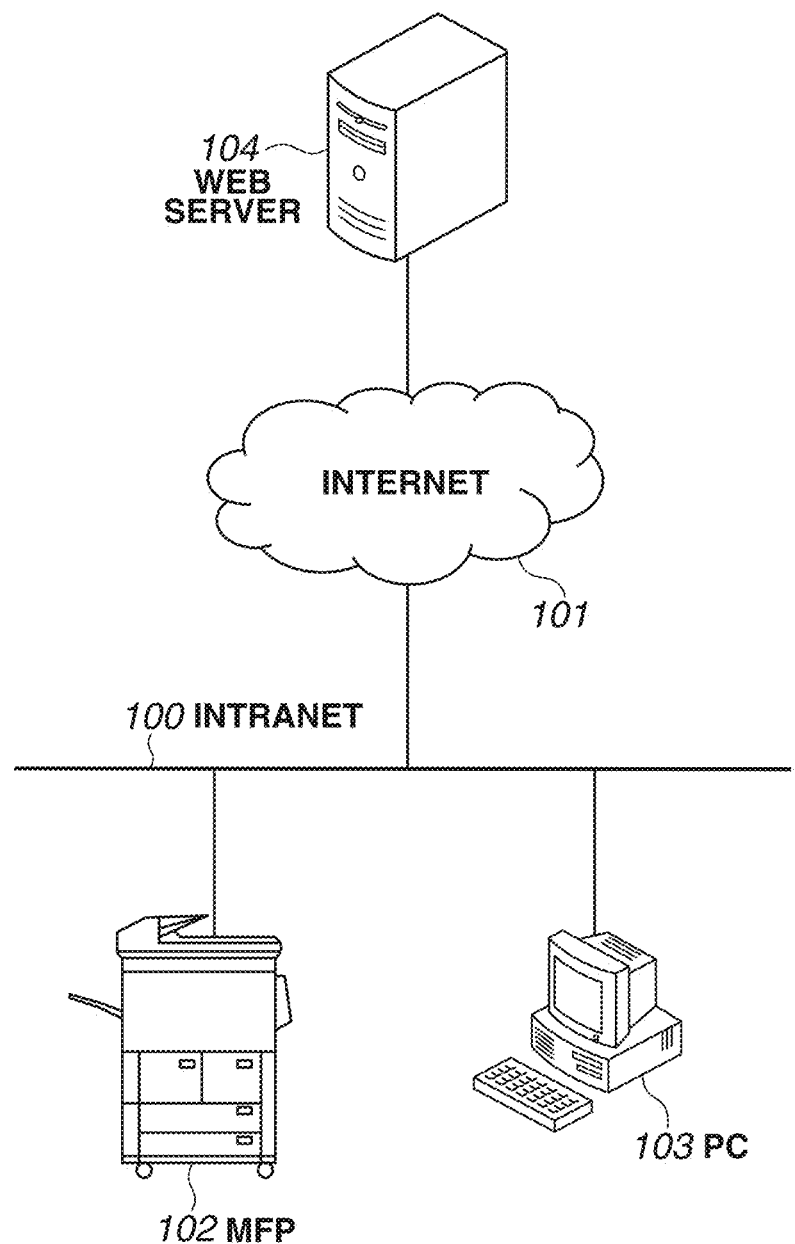
FIG. 1 is a diagram illustrating a system configuration.

FIG. 1 illustrates a configuration example of an information processing system according to a first exemplary embodiment of the present disclosure. The information processing system according to the first exemplary embodiment includes an intranet 100, the Internet 101, a multi-function peripheral (MFP) 102, a personal computer (PC) 103, and a web server 104. The number of MFPs 102 is not limited to one. A plurality of MFPs 102 can be placed on a network.

The intranet 100 is a network infrastructure for the MFP 102 and the PC 103 to communicate with each other. The Internet 101 is a network infrastructure for the MFP 102 and the PC 103 to communicate with the web server 104. The MFP 102 is an example of an image processing apparatus, and may be, for example, a printer. The MFP 102 is connected to the web server 104 via the Internet 101 and transmits job log information including at least one job log to the web server 104.

The PC 103 is a PC such as a laptop computer, which is used by an administrator or the like. The PC 103 is connected with the MFP 102 via the intranet 100. The PC 103 transmits key data for encrypting the job log to the MFP 102, and registers the key data in the MFP 102. The PC 103 is also connected to the web server 104 via the Internet 101. The PC 103 transmits a job log search request to the web server 104 and receives a search result.

Figure 2A:
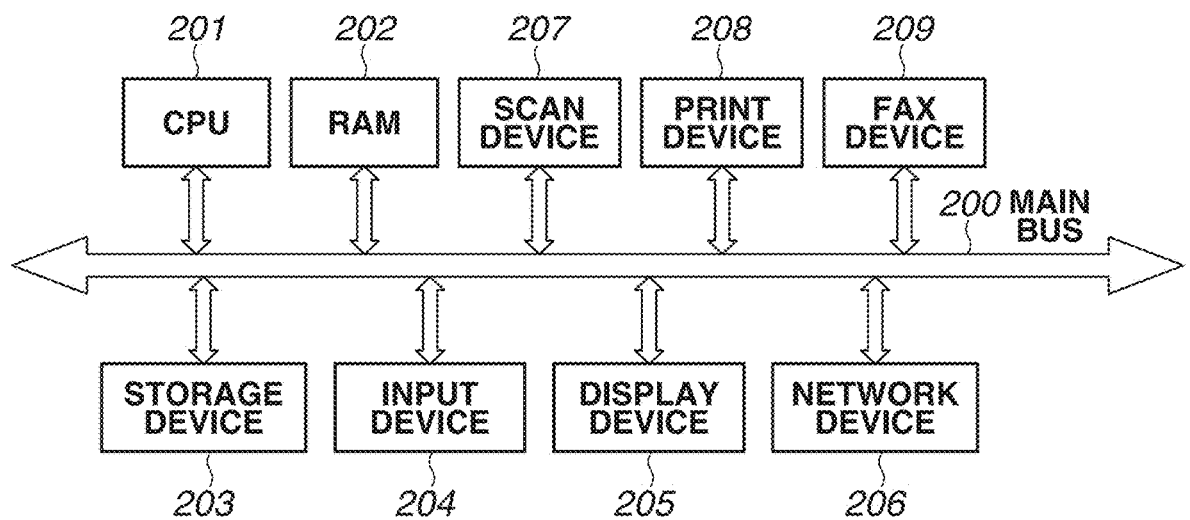
FIGS. 2A and 2B are block diagrams illustrating hardware configurations of a multi-function peripheral (MFP), a web server, and a personal computer (PC).

FIG. 2A is a block diagram illustrating an example of a hardware configuration of the MFP 102 according to the present exemplary embodiment. The MFP 102 includes a central processing unit (CPU) 201, a random access memory (RAM) 202 that provides a work area for the CPU 201, and a storage device 203 (e.g., a hard disk device (HDD) or non-volatile RAM (NVRAM)) that stores programs associated with flowcharts to be described below, other software, and various settings. The MFP 102 also includes an input device 204 used by a user to input a command, a display device 205 that displays a screen, a network device 206 that performs communication with another device via a network, and a main bus 200. In the present exemplary embodiment, unless otherwise specified, in the MFP 102, the CPU 201 controls the RAM 202, the storage device 203, the input device 204, the display device 205, and the network device 206 via the main bus 200. In the MFP 102, a scan device 207, a print device 208, and a facsimile (fax) device 209 are also connected to the main bus 200. The display device 205 such as a touch panel display may also serve as the input device 204.

Figure 2B:
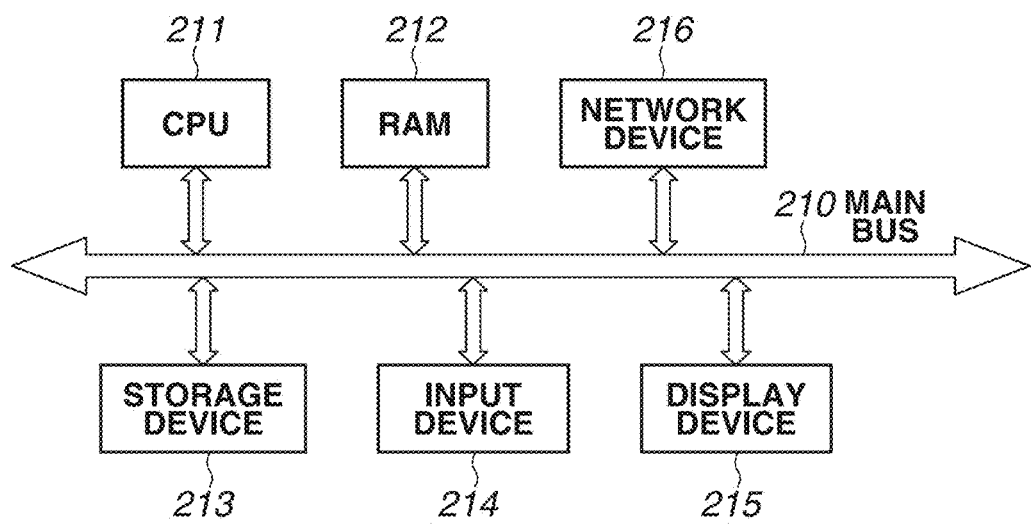

FIG. 2B is a block diagram illustrating an example of a hardware configuration of an information processing apparatus that implements the PC 103, the web server 104, and the like according to the present exemplary embodiment. The information processing apparatus includes a CPU 211, a RAM 212 that provides a work area for the CPU 211, and a storage device 213 (e.g., an HDD or NVRAM) that stores programs associated with flowcharts to be described below, other software, and various settings. The information processing apparatus also includes an input device 214 used by the user to input a command, a display device 215 that displays a screen, a network device 216 that performs communication with another device via a network, and a main bus 210. In the present exemplary embodiment, unless otherwise specified, in each of the web server 104 and the PC 103, the CPU 211 controls the other components illustrated in FIG. 2B via the main bus 210. The display device 215 such as a touch panel display may also serve as the input device 214. The web server 104 need not necessarily include the input device 214 and the display device 215.

Figure 3:
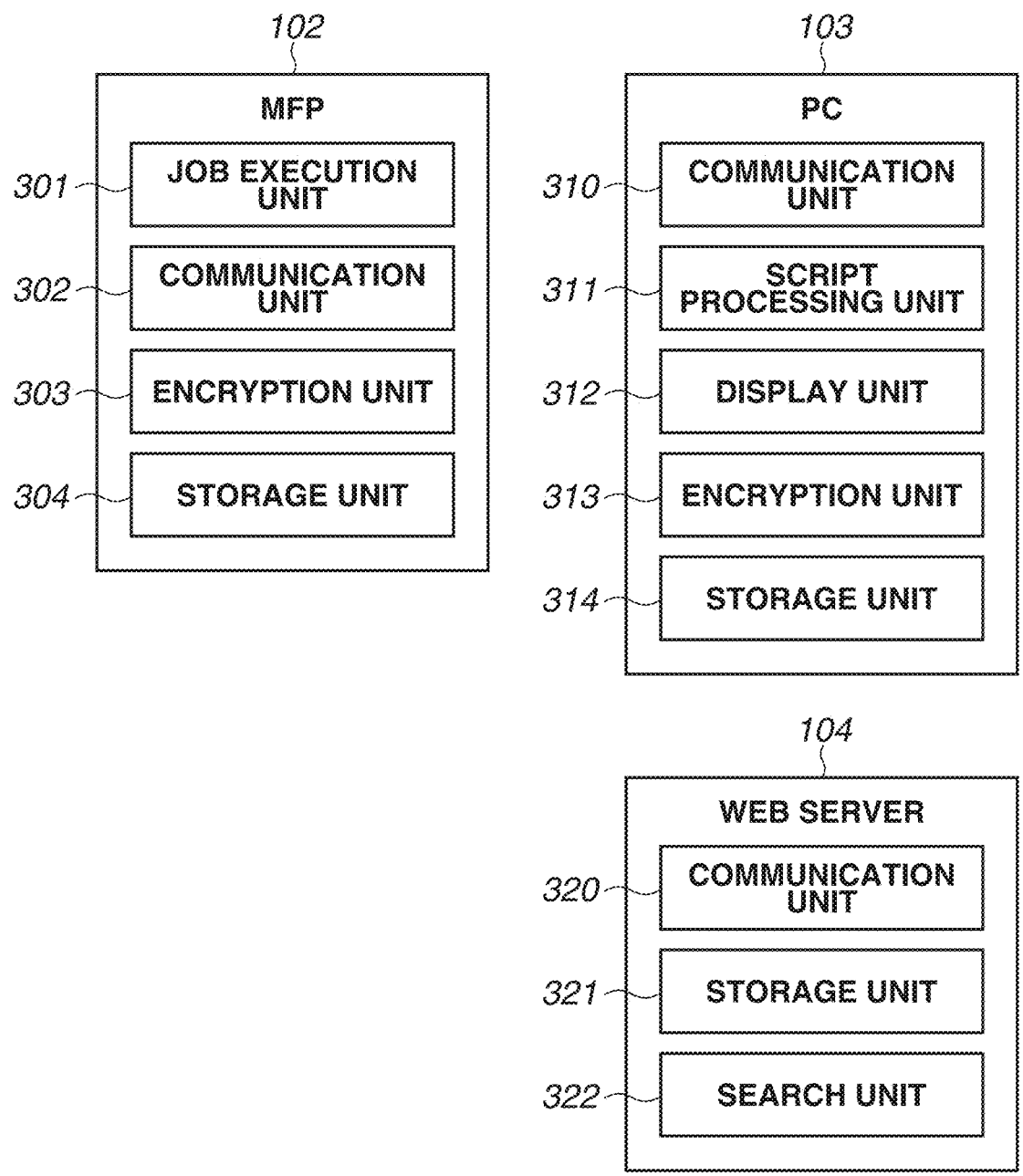
FIG. 3 is a block diagram illustrating a software configuration of each of the MFP, the web server, and the PC.

FIG. 3 is a block diagram illustrating an example of a software configuration of each of the MFP 102, the PC 103, and the web server 104 according to the present exemplary embodiment. Each functional unit illustrated in FIG. 3 is implemented in such a manner that the CPU 201 included in the MFP 102 and the CPU 211 included in each of the PC 103 and the web server 104 execute control programs according to the present exemplary embodiment.

The MFP 102 includes a job execution unit 301, a communication unit 302, an encryption unit 303, and a storage unit 304. The PC 103 includes a communication unit 310, a script processing unit 311, a display unit 312, an encryption unit 313, and a storage unit 314. The web server 104 includes a communication unit 320, a storage unit 321, and a search unit 322.

The software configuration of the MFP 102 will now be described. The job execution unit 301 includes a function for controlling the scan device 207, the print device 208, the fax device 209, and the network device 206 to execute a job for processing, such as copying, printing, facsimile transmission, facsimile reception, and scan transmission. For each job execution, the job execution unit 301 stores a job attribute and a job image that are associated with the job as a job log in the storage unit 304. Table A illustrates an example of the job log stored in the storage unit 304. The term job image refers to image data representing an image output from the MFP 102 when a job is executed.

TABLE A

| Device ID | Job Name | User Name | Date and Time | Job Type | Job Image |
|---|---|---|---|---|---|
| ABC001 | WeeklyReport.doc | user1 | 2018/11/19 18:46 | Print | ... |

The job log includes the job attribute and the job image. The job attribute includes a device identification (ID), which is information for identifying the MFP 102, a job name, a user name, a date and time, and a job type. The job log illustrated in Table A indicates a print job with the name "WeeklyReport.doc" that is executed by the user "user1" using the device "ABC001" on the date and time "2018/11/19 18:46".

The communication unit 302 includes a function for communicating with the web server 104 or the PC 103 using a Hypertext Transfer Protocol (HTTP). The communication unit 302 receives the key data used for encrypting the job log from the PC 103, and transmits the encrypted job log to the web server 104. The communication unit 302 encrypts a communication channel using Transport Layer Security (TLS).

The encryption unit 303 includes a function for encrypting the job log stored in the storage unit 304. The encryption unit 303 encrypts the job attribute using format-preserving encryption (FPE), and encrypts the job image using a combination of a common key and a public key. FPE is one type of common key encryption. A value encrypted with FPE has uniqueness, and accordingly encrypted data can be searched as it is. Encryption processing performed by the MFP 102 will be described in detail below with reference to FIG. 4.

The storage unit 304 stores the job log and the key data in the storage device 203. If the CPU 201 has a Trusted Platform Module (TPM) mounted thereon, the key data may be encrypted using the TPM and the encrypted key data may be stored in the storage unit 304.

Next, the software configuration of the PC 103 will be described. The communication unit 310 has a function of communicating with the MFP 102 or the web server 104 via the network device 216 using the HTTP protocol. The communication unit 310 receives content including an operation screen from the web server 104, transmits the key data for encrypting the job log to the MFP 102, transmits the job log search request to the web server 104, and receives the job log as the search result. The communication unit 310 encrypts a communication channel using TLS.

The script processing unit 311 analyzes JavaScript® included in the content received by the communication unit 310, and controls importing of the key data, encryption of a search value, and decryption of a job log.

The display unit 312 includes a function for interpreting HyperText Markup Language (HTML) and Cascading Style Sheets (CSS) included in the content received from the web server 104, and displaying an operation screen on the display device 215. The display unit 312 also includes a function of receiving an input operation from the input device 214.

A management screen displayed by the display unit 312 includes screens for importing the key data into the PC 103 and the MFP 102, and searching the job log stored in the web server 104 to refer to the job image. A management screen displayed by the PC 103 will be described below with reference to FIG. 5.

The encryption unit 313 includes a function of encrypting the job log search request and decrypting the encrypted job log. The storage unit 314 has a function of storing the key data used for encrypting the job log in the storage device 213 of the PC 103. More specifically, the storage unit 314 stores a common key used for encrypting the job attribute and a key pair (a public key and a secret key) used for decrypting the job image.

Next, the software configuration of the web server 104 will be described. The communication unit 320 has a function of communicating with the MFP 102 or the PC 103 via the network device 216 using the HTTP protocol. The communication unit 320 receives the job log transmitted from the MFP 102, receives a search request transmitted from the PC 103, and transmits a response indicating the job log to the PC 103. The communication unit 320 encrypts a communication channel using TLS.

The storage unit 321 has a function of storing, as the job log information, at least one job log received from the MFP 102 in the storage device 213 of the web server 104. The storage unit 321 stores, as the job log information, the job attribute in a database and the job image in a file system, and manages the job log information. The search unit 322 receives the job log search request and performs search processing.

Table B is a table schematically illustrating a database in which the job log information managed by the storage unit 321 is stored. The database includes a device ID, a job name, a user name, a date and time, a job type, an image file path, and a session key. The device ID, the job name, the user name, the date and time, and the job type indicate the job attribute of each job log transmitted from the MFP 102. The session key is a common key used by the MFP 102 to encrypt the job image. The job attribute and the session key are already encrypted by the MFP 102.

Table B illustrates values in plain text for convenience of explanation. However, in practice, the storage unit 321 stores and manages the values as encrypted data. A job image path is a file path for each job image stored in the file system. As with the job attribute, each job image is already encrypted by the MFP 102. Thus, information included in each job log received from the MFP 102 is managed as encrypted data. The encryption processing performed by the MFP 102 will be described in detail below with reference to FIG. 7.

Next, the management screen displayed by the PC 103 will be described with reference to a screen transition diagram illustrated in FIG. 4.

A login screen 401 is a screen on which an ID and a password are input to log in to the web server 104. If login processing on the login screen 401 is successful, the screen transitions to a main menu screen 402. The main menu screen 402 is a screen for starting an initial setting and a log search. The main menu screen 402 includes an initial setting button and a log search button. If the initial setting button is pressed, the screen transitions to an initial setting screen 403. If the log search button is pressed, the screen transitions to a log search screen 407. The initial setting screen 403 is a screen for making an initial setting for each of the PC 103 and the MFP 102. The initial setting screen 403 includes a PC setting button and a device setting button. If the PC setting button is pressed, the screen transitions to a PC setting screen 404. If the device setting button is pressed, the screen transitions to an MFP setting screen 405. The PC setting screen 404 is a screen used for importing the key data for encrypting the job log into the PC 103.

The PC setting screen 404 includes a common key file input field, a key pair file input field, and a key registration button. In the common key file input field, a file path for a common key used to encrypt the job attribute is designated. In the key pair file input field, a file path for the key pair (the public key and the secret key) used for encrypting the job image is designated. If the key registration button is pressed, the designated key data is stored in the storage unit 314. The PC setting screen 404 can provide not only a user interface (UI) used for importing of a key file prepared by the user in advance but also a UI used for generating a key on the PC 103.

The MFP setting screen 405 is a screen for importing the key data used for encrypting the job log into the MFP 102. The MFP setting screen 405 includes a managed MFP list and a key registration button. If the key registration button is pressed, the screen transitions to a device authentication screen 406 so that the key data is imported into the MFP 102 designated in the managed MFP list. The key data to be imported into the MFP 102 here is the key data that is preliminarily imported into the PC 103 on the PC setting screen 404. The device authentication screen 406 is a screen on which an ID and a password are input so that the MFP 102 is authenticated. If authentication processing is successful, the key data exported from the PC 103 is imported into the MFP 102.

The log search screen 407 is a screen for searching through job logs stored in the web server 104. The log search screen 407 includes a search value input field and a search button. If the search button is pressed, the PC 103 performs search processing to determine whether a job log having a job attribute value that matches a search value for a designated job attribute is present in the web server 104. When the

TABLE B

| Device ID | Job Name | User Name | Date and Time | Job Type | Job Image Path | Session Key |
|---|---|---|---|---|---|---|
| ABC001 | WeeklyReport.doc | user1 | 2018/11/19 18:46 | Print | 0001.pdf | ******** |
| ABC002 | DevelopmentPlan.ppt | user2 | 2018/11/20 09:31 | Print | 0002.pdf | ******** |
| ABC001 | | user3 | 2018/11/20 10:12 | Copy | 0003.pdf | ******** |
| ABC001 | NovemberStatement | user1 | 2019/11/24 15:40 | ScanFax | 0004.pdf | ******** | search processing is completed in the web server 104, the screen transitions to a search result screen 408. The search result screen 408 is a screen for checking the retrieved job log. The search result screen 408 includes a job log list and an open button. The job log list is a list of retrieved job log information. If the open button is pressed, the log image of the job log designated in the job log list is displayed.

In the case of searching for the job log, the encryption unit 313 encrypts the job attribute value to be searched for with FPE. Further, the encryption unit 313 decrypts the encrypted data using a combination of the common key and the public key, accordingly enabling the job image of the job log to be browsed. The key data used for encryption is preliminarily stored in the storage unit 314. Encryption processing performed by the PC 103 will be described in detail below with reference to FIG. 10.

Next, a processing flow in which the PC 103 and the MFP 102 import the key data will be described with reference to a flowchart illustrated in FIG. 5. Each control program for executing processing illustrated in the flowchart of FIG. 5 is stored in either the RAM or the storage device of each device and is executed by the CPU. Processing of steps S501 to S504 and step S508 is executed by the PC 103, and processing of steps S505 to S507 is executed by the MFP 102.

In the flowchart illustrated in FIG. 5, the processing of step S501 is started when the display unit 312 of the PC 103 receives an instruction to display the management screen.

In step S501, the communication unit 310 of the PC 103 transmits an HTTP request for acquiring the management screen to the web server 104, and receives an HTTP response including content that is the management screen from the web server 104. In step S502, the display unit 312 of the PC 103 interprets the content and displays the management screen on the display device 215. Upon receiving an operation instruction from the input device 204 with transition of the management screen described above, the display unit 312 of the PC 103 displays the PC setting screen 404. In step S503, the script processing unit 311 of the PC 103 interprets JavaScript® included in the content, and stores the designated common key and key pair in the storage unit 314.

FIGS. 6A, 6B, and 6C each illustrate an example of JavaScript® used for, for example, importing a key. FIG. 6A illustrates JavaScript® for loading each piece of key data from a designated file path. FIG. 6B illustrates JavaScript® for registering a designated piece of key data in the database of the storage unit 314. In FIGS. 6A, 6B, and 6C, each command to be executed is described using a comment line.

Next, in step S504, the script processing unit 311 of the PC 103 interprets JavaScript® included in the content, and transmits a duplicated common key and a duplicated public key to an address (an IP address or a host name) of the designated MFP 102. In the key data included in the key pair, only the public key is used for encrypting the job image in the MFP 102. Accordingly, the secret key is not transmitted in this case. FIG. 6C illustrates JavaScript® for transmitting an HTTP request including common key data and public key data to the address of the designated MFP 102 after setting designated authentication information and thereto.

In step S505, the communication unit 302 of the MFP 102 receives the HTTP request including the common key data and the public key data from the PC 103. In step S506, the storage unit 304 of the MFP 102 stores the received common key data and public key data in the storage device 203. In step S507, the communication unit 320 of the MFP 102 transmits, to the PC 103, an HTTP response indicating that the key data is successfully imported.

In step S508, upon receiving the HTTP response, from the MFP 102, indicating that the key data is successfully imported, the communication unit 310 of the PC 103 transmits an HTTP request indicating that the key data is imported into the MFP 102 to the web server 104. The communication unit 310 of the PC 103 receives the HTTP response from the web server 104, and then the processing ends.

As described above with reference to FIG. 5, each piece of key data used by the MFP 102 to encrypt the job log is securely transmitted from the PC 103 to the MFP 102 via the intranet 100 without being transmitted via the Internet 101. Further, each piece of key data is held in the PC 103 or the MFP 102, not in the web server 104. Accordingly, each piece of key data is securely stored. The present exemplary embodiment describes an example in which the key data prepared by the user in advance is imported into the PC 103 and the MFP 102. However, the present exemplary embodiment is not limited to this example. The encryption unit 313 of the PC 103 may generate the key data and import the generated key data into the PC 103 and the MFP 102.

Next, a processing flow in which the MFP 102 transmits the job log to the web server 104 will be described with reference to a flowchart illustrated in FIG. 7. Each control program for executing processing illustrated in the flowchart of FIG. 7 is stored in either the RAM 202 or the storage device 203 and is executed by the CPU 201.

Figure 7:
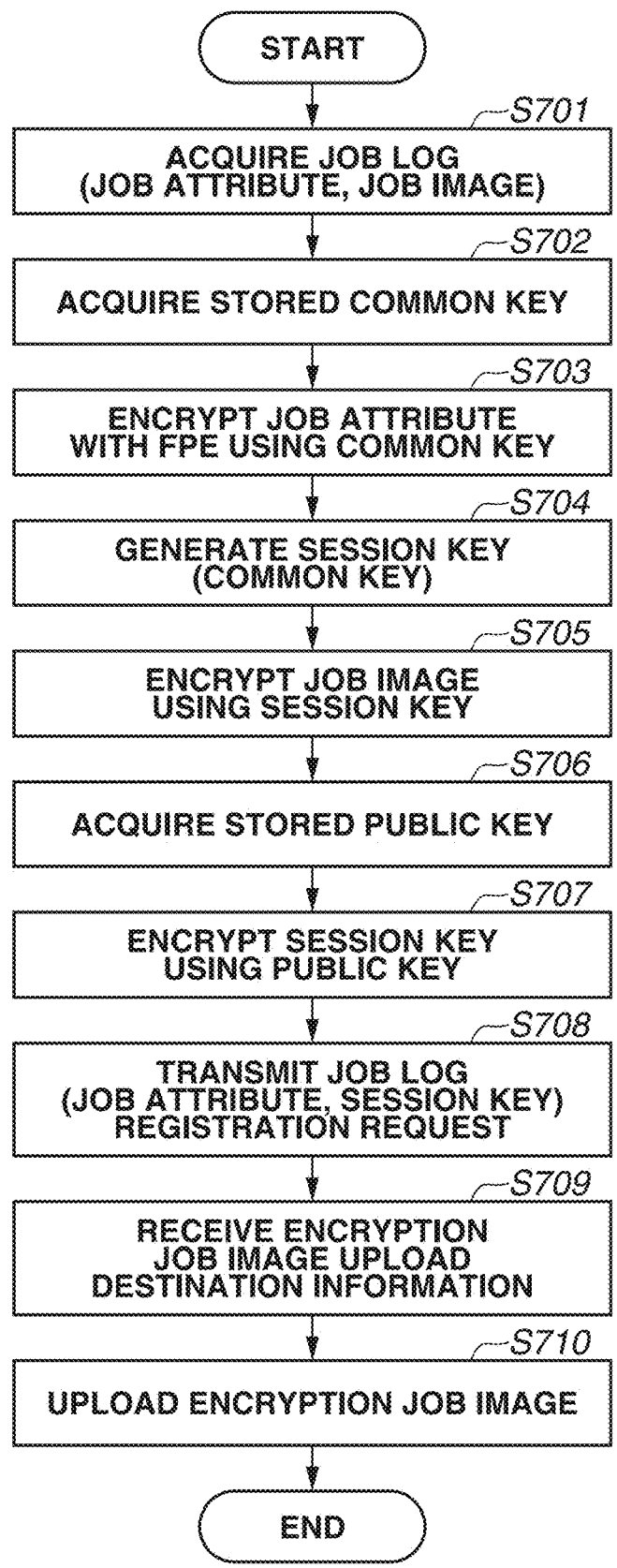
FIG. 7 is a flowchart illustrating processing in which the MFP transmits a job log.

The flowchart illustrated in FIG. 7 is a flowchart indicating processing in which the MFP 102 transmits the job log. The job execution unit 301 of the MFP 102 starts the processing when the job log is stored in the storage unit 304.

In step S701, the encryption unit 303 of the MFP 102 acquires the job log stored in the storage unit 304. As illustrated in Table A, the job log includes the job attribute and the job image. The job attribute includes the job name, the user name, the date and time, and the job type. In step S702, the encryption unit 303 of the MFP 102 acquires a common key stored in the storage unit 304. As described above, the common key is preliminarily imported from the PC 103. In step S703, the encryption unit 303 of the MFP 102 encrypts the job attribute value with FPE using the acquired common key.

In step S704, the encryption unit 303 of the MFP 102 generates the common key. The common key is referred to as a session key. In step S705, the encryption unit 303 of the MFP 102 encrypts the job image using the session key. The job attribute value, which is a search target, is encrypted using the same key for all jobs. On the other hand, a different key is used for each job to encrypt the job image, accordingly reducing a security risk in case of key leakage. Next, in step S706, the encryption unit 303 of the MFP 102 acquires a public key stored in the storage unit 304. As described above, the public key is preliminarily imported from the PC 103. In step S707, the encryption unit 303 of the MFP 102 encrypts the session key using the public key. To decrypt the session key, the secret key is to be used. Accordingly, only the PC 103 that holds the secret key can decrypt the job image.

In step S708, the communication unit 302 of the MFP 102 transmits, to the web server 104, an HTTP request for registering an encryption job log. FIGS. 8A, 8B, and 8C each illustrate an example of an HTTP message used during the registration of the encryption job log.

FIG. 8A illustrates an example of the HTTP request transmitted in step S708. A header of the HTTP request includes Uniform Resource Locator (URL) information about the web server 104 and authentication information about the web server 104. A body of the HTTP request includes the job attribute, such as a device ID, a job name, a user name, a job type, and a date and time, and a session key in a JavaScript® Object Notation (JSON) format. FIG. 8A illustrates the job attribute value in plain text for convenience of explanation. However, in practice, each value is encrypted with FPE as described above.

Next, in step S709, the communication unit 302 of the MFP 102 receives an HTTP response including job image upload destination information from the web server 104. FIG. 8B illustrates an example of the HTTP response received in step S709. A body of the HTTP response includes the job image upload destination information in the JSON format. The job image upload destination information includes a URL where an encryption job image is uploaded, and includes an access key used to authorize the upload.

In step S710, the communication unit 302 of the MFP 102 transmits an HTTP request for uploading the encryption job image. FIG. 8C illustrates an example of the HTTP request transmitted in step S710. A header of the HTTP request includes a URL to which the encryption job image is uploaded, and the access key. A body of the HTTP request includes portable document format (PDF) data as the job image. FIG. 8C illustrates the job image in plain text for convenience of explanation. However, in practice, the job image is encrypted using the session key as described above. The communication unit 302 of the MFP 102 receives the HTTP response indicating that the upload is completed from the web server 104, and then the processing ends.

In this manner, all job attributes and job images transmitted to the web server 104 from the MFP 102 are encrypted. The present exemplary embodiment illustrates an example in which job log acquisition processing is started when the job execution unit 301 of the MFP 102 stores the job log in the storage unit 304. However, the present exemplary embodiment is not limited to this example. The job log acquisition processing can be started for at least one job log that has not been transmitted yet periodically based on a preset schedule.

Next, a processing flow in which the web server 104 registers the job log information received from the MFP 102 will be described with reference to a flowchart illustrated in FIG. 9. Each control program for executing processing illustrated in the flowchart of FIG. 9 is stored in either the RAM 212 or the storage device 213 and is executed by the CPU 211.

The flowchart illustrated in FIG. 9 indicates processing to be started when the web server 104 receives a request for registering the job log.

In step S901, the communication unit 320 of the web server 104 receives an HTTP request for registering the job log, and reads out the device ID, the job name, the user name, the job type, the date and time, and the session key, which are included in the body of the HTTP request in the JSON format.

In step S902, the storage unit 321 of the web server 104 registers the device ID, the job name, the user name, the job type, the date and time, the session key, and the image file path in the database. The image file path refers to a file path where the job image is stored in the file system.

In step S903, the communication unit 320 of the web server 104 transmits an HTTP response including the job image upload destination information to the MFP 102. The job image upload destination information includes a URL where the encryption job image is uploaded, and an access key used to authorize the upload. In this case, the web server 104 limits access sources by the access key and temporarily authorizes the upload of the encryption job image.

In step S904, the communication unit 320 of the web server 104 receives an HTTP request for uploading the encryption job image. In step S905, the storage unit 321 of the web server 104 stores the job image included in the HTTP request in the file path preliminarily registered in the database. The communication unit 320 of the web server 104 transmits an HTTP response indicating that the upload is completed to the MFP 102, and then the processing ends.

In this manner, all job attributes and job images that are registered in the database by the web server 104 are encrypted.

Next, processing in which the PC 103 searches for an encrypted job log will be described with reference to a flowchart illustrated in FIG. 10. Each control program for executing processing illustrated in the flowchart of FIG. 10 is stored in the RAM 212 or the storage device 213 and is executed by the CPU 211.

Figure 10:
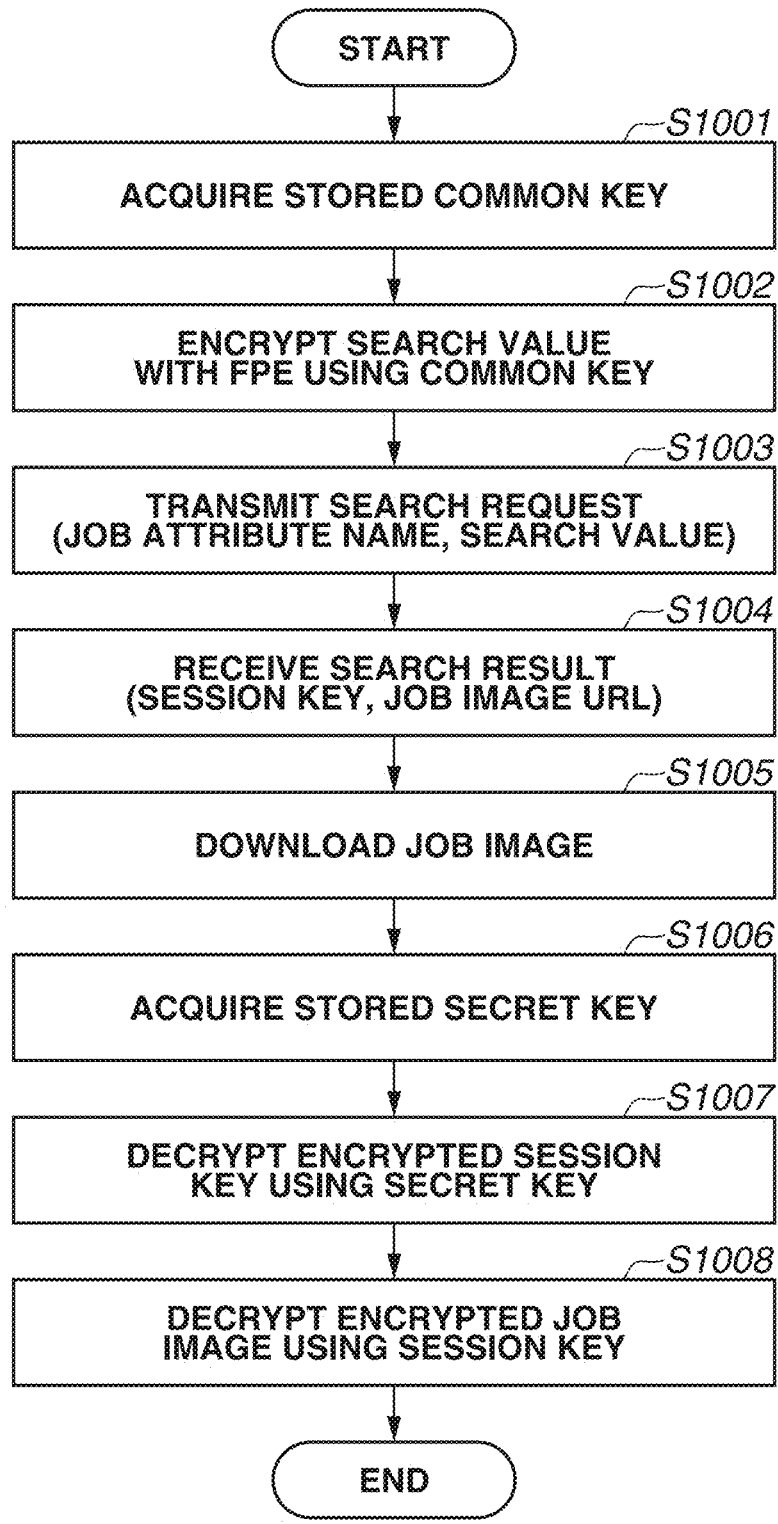
FIG. 10 is a flowchart illustrating processing in which the PC searches a job attribute.

The processing illustrated in FIG. 10 is started when the script processing unit 311 of the PC 103 receives a log search instruction.

In step S1001, the script processing unit 311 of the PC 103 interprets JavaScript® included in the content of the management screen, and acquires the common key stored in the storage unit 314. In step S1002, the script processing unit 311 encrypts a search value, which is received together with the search instruction, with FPE using the common key. In step S1003, the communication unit 310 of the PC 103 transmits an HTTP request including the encrypted search value and the like to the web server 104 to search the job attribute.

FIG. 11A illustrates an example of the HTTP request transmitted in step S1003. A header of the HTTP request includes URL information about the web server 104 and authentication information about the web server 104. A body of the HTTP request includes an attribute name and a search value to be searched for in the JSON format. The example illustrated in FIG. 11A indicates the HTTP request for searching for a job log having the user name "user1" and the job type of facsimile transmission. FIG. 11A illustrates the search value in plain text for convenience of explanation. However, in practice, data to be searched, such as the attribute name and the search value, is encrypted with FPE.

Next, in step S1004, the communication unit 310 of the PC 103 receives an HTTP response including the search result from the web server 104. FIG. 11B illustrates an example of the HTTP response received in step S1004. A body of the HTTP response includes a URL where an encryption job image is downloaded, an access key used to authorize the download, and a session key. Data including the encrypted job attribute can also be downloaded.

Next, in step S1005, the communication unit 310 of the PC 103 transmits an HTTP request for downloading the encryption job image to the web server 104, and downloads the target data. FIG. 11C illustrates an example of the HTTP request transmitted in step S1005. A header of the HTTP request includes URL information about the encryption job image, and an access key used to authorize the download. Thus, the PC 103 transmits the request including the encrypted search value, accordingly making it possible to acquire the encryption job image.

Decryption processing for decrypting the encrypted job log is executed in steps S1006 to S1008. First, in step S1006, the encryption unit 313 of the PC 103 acquires a secret key from the storage unit 314 of the PC 103. In step S1007, the encryption unit 313 decrypts the received session key using the secret key. In step S1008, the encryption unit 313 decrypts the encryption job image using the decrypted session key. In this case, if data including the encrypted job attribute is also downloaded, the job attribute is also decrypted using the common key. Thus, in the present exemplary embodiment, only the PC 103 that holds the secret key can decrypt the encrypted job image.

With this processing, the display unit 312 of the PC 103 can display the search result screen 408 including the decrypted job image and the attribute information about the job log corresponding to the decrypted job image.

A processing flow in which the web server 104 searches the attribute information about the encrypted job log without decrypting the job log will be described with reference to a flowchart illustrated in FIG. 12. Each control program for executing processing illustrated in the flowchart of FIG. 12 is stored in either the RAM 212 or the storage device 213 and is executed by the CPU 211. The flowchart illustrated in FIG. 12 is started when the web server 104 receives a search request from the PC 103.

In step S1201, the communication unit 320 of the web server 104 receives an HTTP request for searching for a job log. The search unit 322 reads out the attribute name and the search value that are included in the body of the HTTP request in the JSON format. Information serving as a search key, such as the attribute name and the search value, is encrypted.

In step S1202, the search unit 322 searches for a job log including a value of the job attribute that matches the search value of the attribute name. Through search, the storage unit 321 acquires the corresponding job log from the database illustrated in Table B. In this case, the search value encrypted with FPE by the PC 103 and the value included in the job attribute encrypted with FPE by the MFP 102 are encrypted using the same common key. Accordingly, each value obtained after encryption has uniqueness, and thus a matching search can be performed directly on the encrypted data.

In step S1203, the communication unit 320 of the web server 104 transmits an HTTP response indicating a search result to the PC 103. As described above, the HTTP response includes a URL where the encryption job image is downloaded, an access key used to authorize the download, and a session key. In this case, the web server 104 limits access sources by the access key and temporarily authorizes the download of the encryption job image. Information such as a URL is set by referring to the record of the job log corresponding to the search result in Table B described above.

In step S1204, the communication unit 320 of the web server 104 receives an HTTP request for downloading a job image from the PC 103. As described above, the HTTP request includes URL information about the job image and the access key used to authorize the download. In step S1205, the communication unit 320 of the web server 104 verifies the received access key and then transmits response indicating the encrypted job image to the PC 103. Thus, the web server 104 implements processing for searching for an encrypted job log by using an encrypted search value.

The first exemplary embodiment illustrates a configuration in which common key data is imported into at least one MFP 102 from the PC 103. However, a configuration in which a different common key is used for each device may be employed to reduce the security risk in case of key leakage. More specifically, each job attribute is encrypted using two types of common key, i.e., the same common key used among devices and different common keys used by the different devices. Differences between the first exemplary embodiment and a second exemplary embodiment will be described below with reference to FIGS. 13 to 15C.

Figure 13:
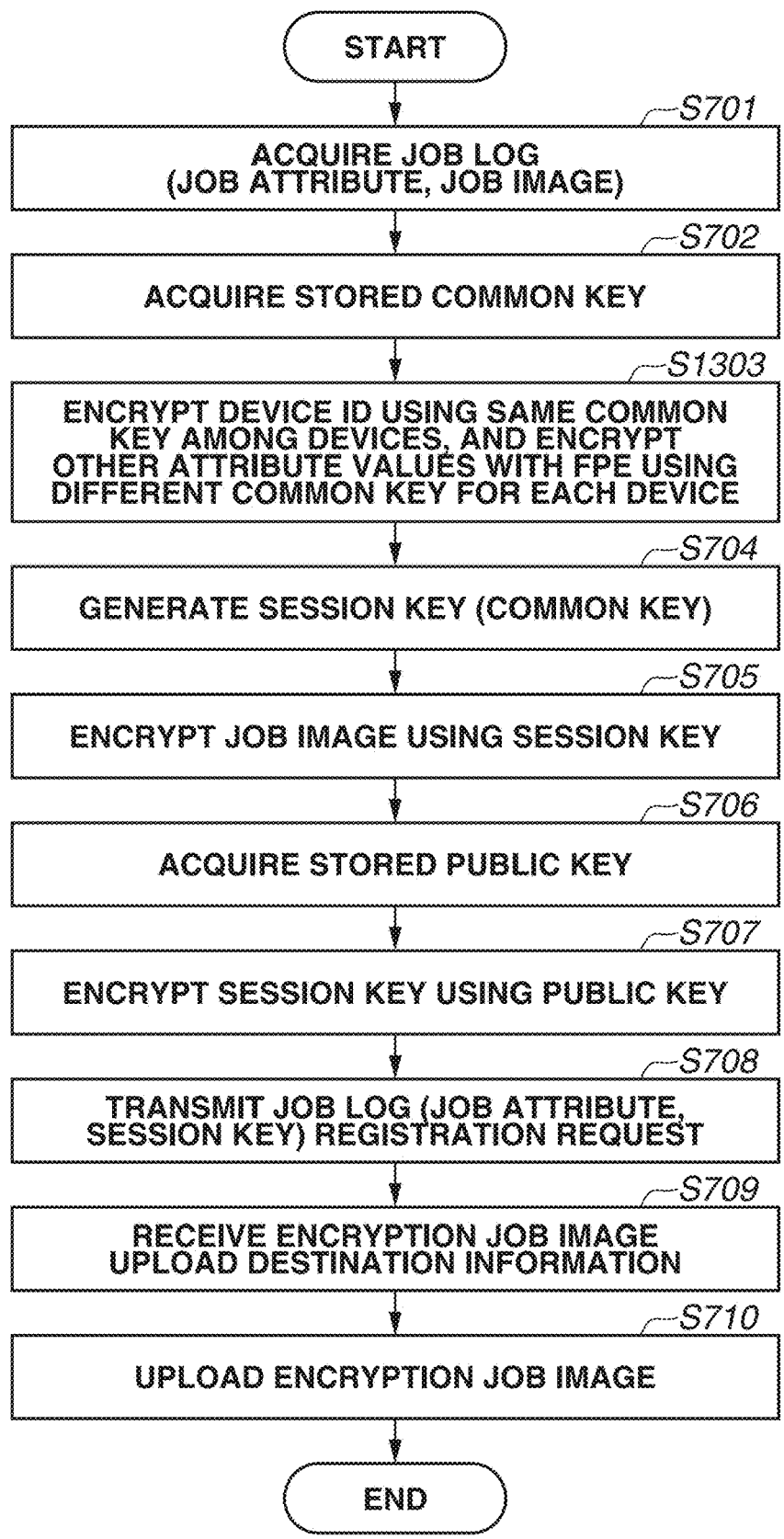
FIG. 13 is a flowchart illustrating processing in which an MFP according to a second exemplary embodiment transmits a job log.

FIG. 13 illustrates an extension of processing performed by the MFP 102 in the flowchart illustrated in FIG. 7 described above according to the second exemplary embodiment. The processing illustrated in FIG. 13 differs from the processing illustrated in FIG. 7 in regard to processing of step S1303.

In step S1303, the encryption unit 303 of the MFP 102 encrypts the device ID of the MFP 102, which is a processing target in this processing, using a unified key, which is the same common key used among a plurality of MFPs 102. The device ID refers to identification information such as a serial number of the MFP 102. Further, the encryption unit 303 of the MFP 102 encrypts the other job attributes by using the different common key for each of the different MFPs 102.

Figure 14:
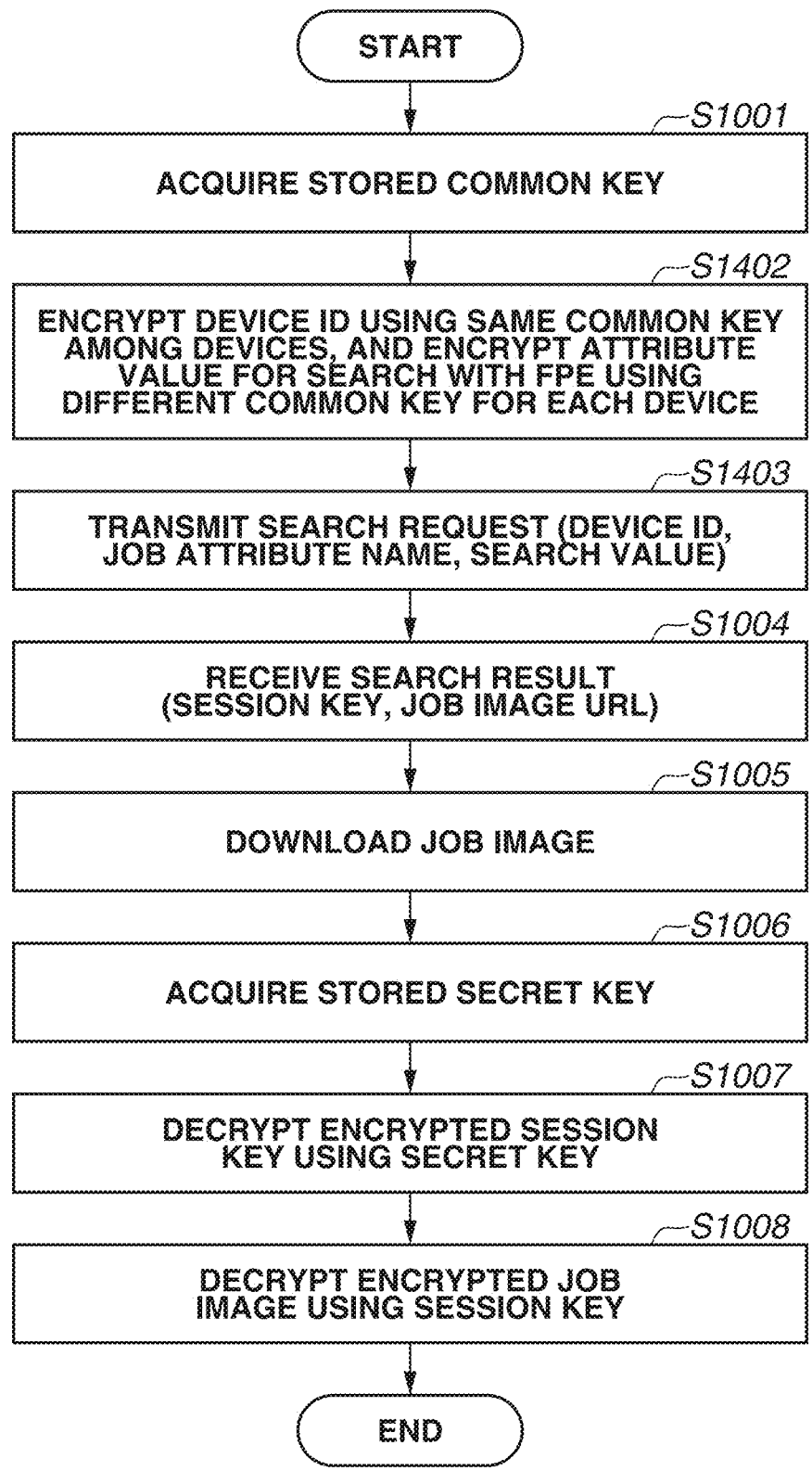
FIG. 14 is a flowchart illustrating processing in which a PC according to the second exemplary embodiment searches a job attribute.

FIG. 14 illustrates an extension of processing performed by the PC 103 in the flowchart illustrated in FIG. 10 described above according to the second exemplary embodiment. The processing illustrated in FIG. 14 differs from the processing illustrated in FIG. 10 in regard to processing of steps S1402 and S1403.

In step S1402, the encryption unit 313 of the PC 103 encrypts the device ID using the unified key. Further, the encryption unit 313 encrypts the job attribute value to be used in a search using the different common key for each of the different devices. In this case, the device ID is encrypted using the unified key because the device ID is used as a main key in the database of the web server 104.

Next, in step S1403, the communication unit 320 of the PC 103 transmits a search request including the encrypted device ID and the value of the job attribute to be searched for to the web server 104.

FIGS. 15A, 15B, and 15C each illustrate an HTTP message used during a search through the job attribute according to the second exemplary embodiment. FIGS. 15A, 15B, and 15C differ from FIGS. 11A, 11B, and 11C in regard to the HTTP message illustrated in FIG. 15A. As described above in step S1403, the HTTP message includes an instruction for executing search processing on all devices to be managed by the web server 104 by using the device ID and the search value.

The example illustrated in FIG. 15A indicates the HTTP message for searching for a job log in which the user name is "user1" and the job type is facsimile transmission with respect to the MFPs 102 to be managed having device IDs "ABC001", "ABC002", and "ABC003". In FIGS. 15A, 15B, and 15C, the device IDs and search values are illustrated in plain text for convenience of explanation. However, in practice, the device IDs "ABC001", "ABC002", and "ABC003" are encrypted with FPE using the unified key. Further, the search values "user1" and "scanfax" are encrypted with FPE using different common keys for the three MFPs 102 having the device IDs "ABC001", "ABC002", and "ABC003", respectively.

According to the second exemplary embodiment, even if the common key for a single MFP 102 is leaked, the job attribute of the other MFPs 102 is prevented from being decrypted.

The scope of the present disclosure includes an apparatus or system configured by combining the above-described exemplary embodiments as appropriate, and a method for the apparatus or system.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-072293, filed Apr. 4, 2019, which is hereby incorporated by reference herein in its entirety.

What is claimed is:

1. An information processing apparatus that communicates with a server via a network, the server configured to manage a plurality of job logs on which encryption processing is executed by an image processing apparatus using a first key, the information processing apparatus comprising:
   at least one memory storing instructions; and
   at least one processor executing the instructions causing the information processing apparatus to
      encrypt a value used for searching for a job log using another first key being a duplicate of the first key,
      transmit a search request including the encrypted value to the server via the network,
      acquire an encrypted job log based on a response from the server, and
      execute decryption processing for decrypting the encrypted job log,
   wherein the server executes search processing using the encrypted value included in the search request without decrypting the plurality of job logs managed.

2. The information processing apparatus according to claim 1,
   wherein each of the plurality of job logs includes attribute information and image data output in a corresponding job,
   wherein the instructions further cause the information processing apparatus to:
      manage a pair of a public key and a secret key; and
      import the public key into the image processing apparatus as a key to be used in encryption processing on the image data included in each of the plurality of job logs,
   wherein the image data encrypted by the image processing apparatus is acquired as the encrypted job log, and
   wherein in the decryption processing, the secret key is used in the decryption processing on the encrypted image data.

3. The information processing apparatus according to claim 2,
   wherein the image processing apparatus encrypts a second key using the public key, the second key used for encrypting the image data, and registers the encrypted image data and the encrypted second key in the server,
   wherein, in a case where the encrypted job log is acquired, the encrypted image data and the encrypted second key are acquired, and
   wherein in the decryption processing, the encrypted second key is decrypted using the secret key, and the encrypted image data is decrypted using the decrypted second key.

4. The information processing apparatus according to claim 2, wherein the image processing apparatus encrypts the attribute information included in each of the plurality of job logs using the first key.

5. A method for an information processing system including an information processing apparatus, an image processing apparatus, and a server, the method comprising:
   executing, by the image processing apparatus, encryption processing on a job log using a first key;
   registering, by the image processing apparatus, a plurality of job logs on which the encryption processing is executed, in the server;
   encrypting, by the information processing apparatus, a value used for searching for the job log using another first key being a duplicate of the first key;
   transmitting, by the information processing apparatus, a search request including the encrypted value to the server via the network;
   executing, by the server, search processing by searching for data corresponding to the encrypted value included in the search request without decrypting the plurality of job logs registered and managed by the image processing apparatus;
   transmitting, by the server, a response indicating a result of the search processing to the information processing apparatus;
   acquiring, by the information processing apparatus, the encrypted job log based on the response from the server; and
   executing, by the information processing apparatus, decryption processing for decrypting the encrypted job log.

6. The method according to claim 5,
   wherein each of the plurality of job logs includes attribute information and image data output in a corresponding job,
   wherein the information processing apparatus manages a pair of a public key and a secret key, and imports the public key into the image processing apparatus as a key to be used in encryption processing on image data included in each of the plurality of job logs,
   wherein the attribute information included in each of the plurality of job logs is encrypted using the first key, wherein encryption processing using the public key is executed on the image data included in each of the plurality of job logs, wherein in the search processing executed by the server, the encrypted attribute information is searched as data corresponding to the encrypted value included in the search request, wherein the information processing apparatus acquires the encrypted image data as the encrypted job log based on the result of the search processing, and wherein the information processing apparatus uses the secret key in the decryption processing.

7. A method for an information processing apparatus that communicates with a server via a network, the server configured to manage a plurality of job logs on which encryption processing is executed by an image processing apparatus using a first key, the method comprising:

encrypting a value used for searching for a job log using another first key being a duplicate of the first key;

transmitting a search request including the encrypted value to the server via the network;

acquiring an encrypted job log based on a response from the server; and executing decryption processing for decrypting the encrypted job log, wherein the server executes search processing using the encrypted value included in the search request without decrypting the plurality of job logs managed.

8. A non-transitory computer-readable storage medium having computer executable instructions stored thereon, wherein execution of the instructions by a computer causes the computer, as an information processing apparatus that communicates with a server via a network, the server configured to manage a plurality of job logs on which encryption processing is executed by an image processing apparatus using a first key, to:

encrypt a value used for searching for a job log using another first key being a duplicate of the first key;

transmit a search request including the encrypted value to the server via the network;

acquire an encrypted job log based on a response from the server; and execute decryption processing for decrypting the encrypted job log, wherein the server executes search processing using the encrypted value included in the search request without decrypting the plurality of job logs managed.

* * * * *